United States Patent
Stone et al.

(10) Patent No.: US 11,927,108 B2
(45) Date of Patent: Mar. 12, 2024

(54) INTEGRATED BLADED ROTOR

(71) Applicant: PRATT & WHITNEY CANADA CORP., Longueuil (CA)

(72) Inventors: Paul Stone, Guelph (CA); Dikran Mangardich, Richmond Hill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/396,670

(22) Filed: Aug. 7, 2021

(65) Prior Publication Data

US 2023/0043965 A1    Feb. 9, 2023

(51) Int. Cl.
*F01D 5/14* (2006.01)

(52) U.S. Cl.
CPC ........ *F01D 5/141* (2013.01); *F05D 2240/305* (2013.01); *F05D 2240/306* (2013.01); *F05D 2250/712* (2013.01)

(58) Field of Classification Search
CPC ............... F01D 5/141; F05D 2240/305; F05D 2240/306; F05D 2250/712
USPC .......................................................... 416/243
See application file for complete search history.

(56) References Cited

U.S. PATENT DOCUMENTS

| | | | |
|---|---|---|---|
| 4,720,239 A | | 1/1988 | Owczarek |
| 5,340,278 A | * | 8/1994 | Magowan ............... F01D 5/187 |
| | | | 416/97 R |
| 10,502,230 B2 | | 12/2019 | Anderson |
| 10,844,726 B2 | | 11/2020 | Horn et al. |
| 2018/0023397 A1 | * | 1/2018 | Vandeputte ............. F01D 5/147 |
| | | | 416/228 |
| 2019/0024673 A1 | * | 1/2019 | Anderson ................. F02C 3/04 |
| 2019/0120061 A1 | * | 4/2019 | Horn ....................... F01D 5/141 |

FOREIGN PATENT DOCUMENTS

WO    2021004821 A1    1/2021

OTHER PUBLICATIONS

European Patent Office, Communication re. extended European search report for European patent application No. 22189341.5, dated Jan. 10, 2023.

* cited by examiner

*Primary Examiner* — Yi-Kai Wang
(74) *Attorney, Agent, or Firm* — Norton Rose Fulbright Canada LLP (57) ABSTRACT

An integrated bladed rotor of a gas turbine engine is provided. The integrated bladed rotor includes a hub having a rotation axis and a radially outer platform relative to the rotation axis, and a plurality of blades extending radially outwardly from the outer platform of the hub. The blades are integrally formed with the hub to define a monolithic component with the hub. Two or more of the blades each include: an airfoil including a groove formed in an outer surface of the airfoil to mitigate crack propagation, and a root fillet providing a transition between the outer platform of the hub and the airfoil.

18 Claims, 7 Drawing Sheets

FIG.2

INTEGRATED BLADED ROTOR

TECHNICAL FIELD

The disclosure relates generally to gas turbine engines, and more particularly to integrated bladed rotors of gas turbine engines.

BACKGROUND

Integrally bladed rotors (IBRs) are used in some gas turbine engine applications, and include a unitary structure that includes a hub from which a plurality of non-removable circumferentially arranged rotor blades radially extend. IBRs eliminate the need for individual blade attachments. IBRs have been used for both fan and compressor applications in (e.g., turbofan) gas turbine engines. The rotor blades of IBRs may be subjected to stresses during gas turbine engine operation. Because IBR rotor blades are integrally formed with the rotor hub, the stress field may extend into the rotor hub from which the blades extend.

SUMMARY

In one aspect, the disclosure describes an integrated bladed rotor of a gas turbine engine. The integrated bladed rotor comprises:

a hub having a rotation axis and a radially outer platform relative to the rotation axis; and a plurality of blades extending radially outwardly from the platform of the hub, the blades being integrally formed with the hub to define a monolithic component with the hub, each blade including:

an airfoil including a groove formed in an outer surface of the airfoil; and a root fillet providing a transition between the outer platform of the hub and the airfoil, the root fillet defining a concave surface extending from the outer platform of the hub to the airfoil, wherein the groove is disposed radially outward of the root fillet.

In another aspect, the disclosure describes a monolithic bladed rotor of an axial compressor of a gas turbine engine. The monolithic bladed rotor comprises:

a hub having a rotation axis and a radially outer platform relative to the rotation axis; and a blade integral with the hub and extending radially outwardly from the platform of the hub, the blade including:

an airfoil including a groove formed in an outer surface of the airfoil; and a root fillet providing a transition between the outer platform of the hub and the airfoil, the root fillet and the airfoil having tangent surface continuity, wherein the groove is disposed radially outward of the root fillet.

In a further aspect, the disclosure describes a gas turbine engine comprising:

an axial compressor for compressing air, the compressor defining a gas path for conveying the air, the compressor including a monolithic integrated bladed rotor including:

a hub having a rotation axis and a radially outer platform defining part of the gas path; and a plurality of blades extending radially outwardly from the platform of the hub and into the gas path, the blades being integrally formed with the hub, two or more of the blades each including:

an airfoil including a groove formed in an outer surface of the airfoil, a majority of the groove being parallel to an expected flow direction of the air interacting with the airfoil; and a root fillet providing a transition between the outer platform of the hub to the airfoil, the root fillet defining a concave surface extending from the outer platform of the hub to the airfoil;

a combustor in which the air compressed by the compressor is mixed with fuel and ignited to generate a stream of combustion gas; and a turbine operatively connected to the combustor for extracting energy from the combustion gas.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to mitigating crack propagation in integrated bladed rotors of gas turbine engines. In some embodiments, the mitigation of crack propagation in integrated bladed rotors may be achieved by way of a streamwise groove (e.g., depression, notch) formed on an outer surface of an airfoil of one or more blades of the integrated bladed rotor. The groove may be configured to influence crack propagation to reduce the risk of a large and uncontained fragment of the integrated bladed rotor being released from the integrated bladed rotor due to fracture during operation of the gas turbine engine.

Aspects of various embodiments are described below through reference to the drawings.

The term "connected" may include both direct connection in which two elements contact each other and indirect connection in which at least one additional element is located between the two elements. The term "substantially" as used herein may be applied to modify any quantitative representation which could permissibly vary without resulting in a change in the basic function to which it is related.

Figure 1:
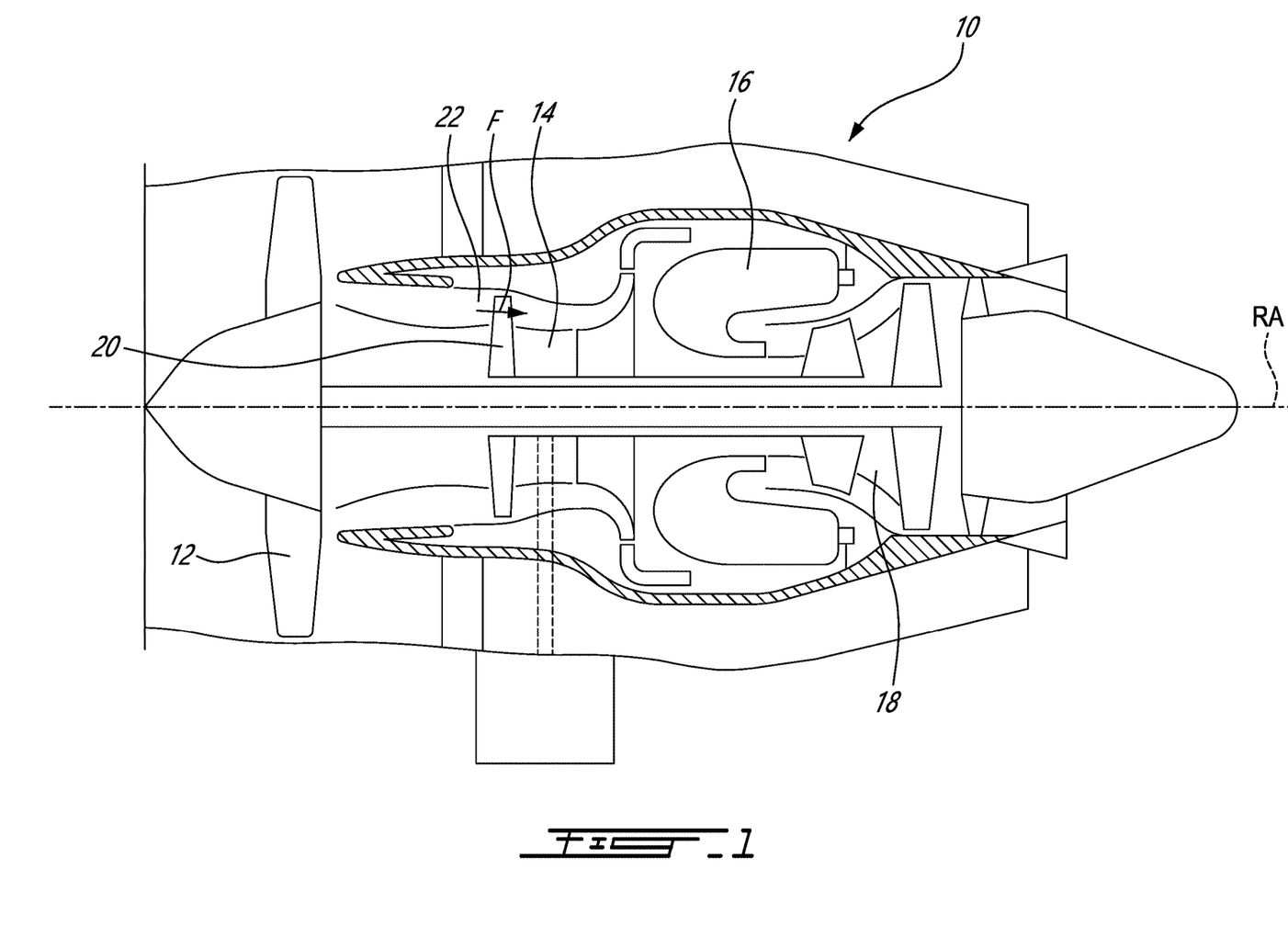
FIG. 1 shows a schematic axial cross-section view of an exemplary turbofan gas turbine engine.

FIG. 1 illustrates gas turbine engine 10 (referred hereinafter as "engine 10") of a type preferably provided for use in subsonic flight, generally comprising in serial flow communication, fan 12 through which ambient air is propelled, a (e.g., multistage) compressor 14 for compressing the air, combustor 16 in which the compressed air is mixed with fuel and ignited for generating a(n) (e.g., annular) stream of hot combustion gas, and turbine section 18 for extracting energy from the combustion gas.

In some embodiments, compressor 14 may include one or more integrated bladed rotors such as integrated bladed rotor 20 (referred herein after as "IBR 20") as described herein.

IBR 20 may be rotatable about rotation axis RA during operation of engine 10. In some embodiments of engine 10, rotation axis RA may correspond to a central axis of engine 10. In various embodiments, IBR 20 may be part of a high-pressure spool, or may be part of a low-pressure spool of engine 10. In some embodiments of engine 10, fan 12 may instead or in addition also be an integrated bladed rotor as described herein. Even though FIG. 1 shows engine 10 being of the turbofan type, it is understood that aspects of the present disclosure are also applicable to other (e.g., turboshaft, turboprop) types of gas turbine engines.

Compressor 14 may define gas path 22 of the core of engine 10. Gas path 22 may be defined by and be disposed between a radially inner shroud and a radially outer shroud of compressor 14. Gas path 22 may have an annular configuration and may extend around rotation axis RA. Gas path 22 may extend principally axially at the location of IBR 20. IBR 20 may be used as an airfoil-based axial compressor in engine 10 and may compress and convey the air toward combustor 16 during operation of engine 10. The air being compressed through gas path 22 in the region of IBR 20 may flow principally parallel to rotation axis RA (i.e., axially). FIG. 1 shows an expected flow direction F of the air interacting with one or more blades of IBR 20 during operation of engine 10.

Figure 2:
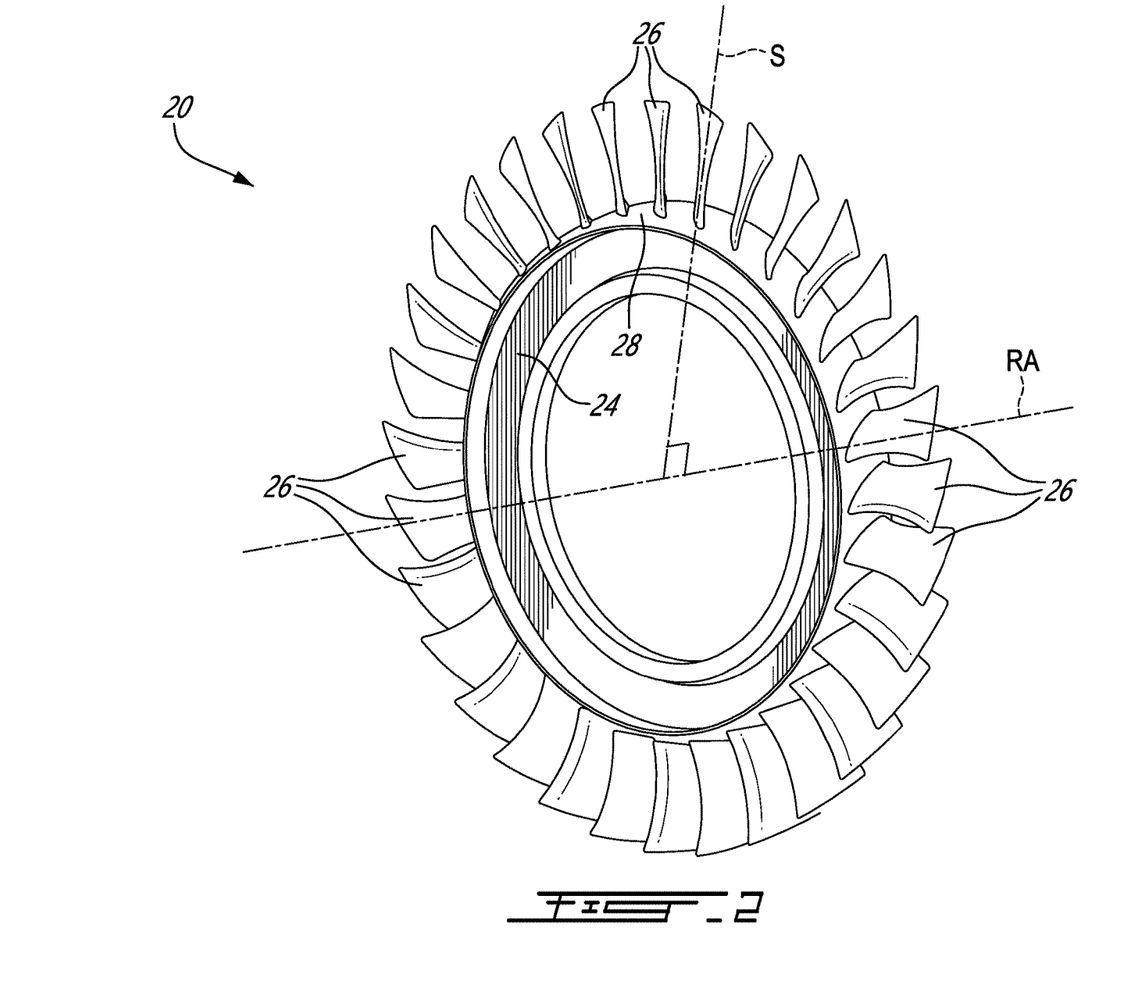
FIG. 2 is a perspective view of an exemplary integrated bladed rotor of the gas turbine engine of FIG. 1.

FIG. 2 is a perspective view of an exemplary representation of IBR 20 of engine 10. IBR 20 may be a monolithic component (i.e., unitary structure) that includes hub 24 from which one or more (i.e., a plurality) of non-removable circumferentially arranged rotor blades 26 radially extend. In other words, blades 26 may be integral (e.g., integrally formed) with hub 24 so that IBR 20 may be devoid of individual releasable blade attachments between blades 26 and hub 24. IBR 20 may also be referred to as a bladed disk ("blisk"), or a bladed ring ("bling").

Hub 24 and the entire IBR 20 may have rotation axis RA. Hub 24 may have radially outer platform 28 (also referred to as a "rim" of IBR 20) relative to rotation axis RA. Platform 28 may define part of gas path 22 shown in FIG. 1. For example, platform 28 may define part of the radially inner shroud of gas path 22 defined by compressor 14. Blades 26 may extend radially outwardly from platform 28. It is understood that the term "radially outwardly" includes directions that are principally radially outward and not necessarily purely radially outward. For example, it is understood that blades 26 may be tilted and may not necessarily extend purely radially from hub 24.

FIG. 2 also shows an exemplary airfoil stacking line S, which is a reference line commonly used to designate the position in space of planar cross sections of a rotor blade such as one of blades 26 where the rotor blade may generally lie along stacking line S. Airfoil stacking line S may extend radially from rotation axis RA and may provide a frame of reference for a corresponding one of blades 26, and for other elements mentioned herein.

Figure 3:
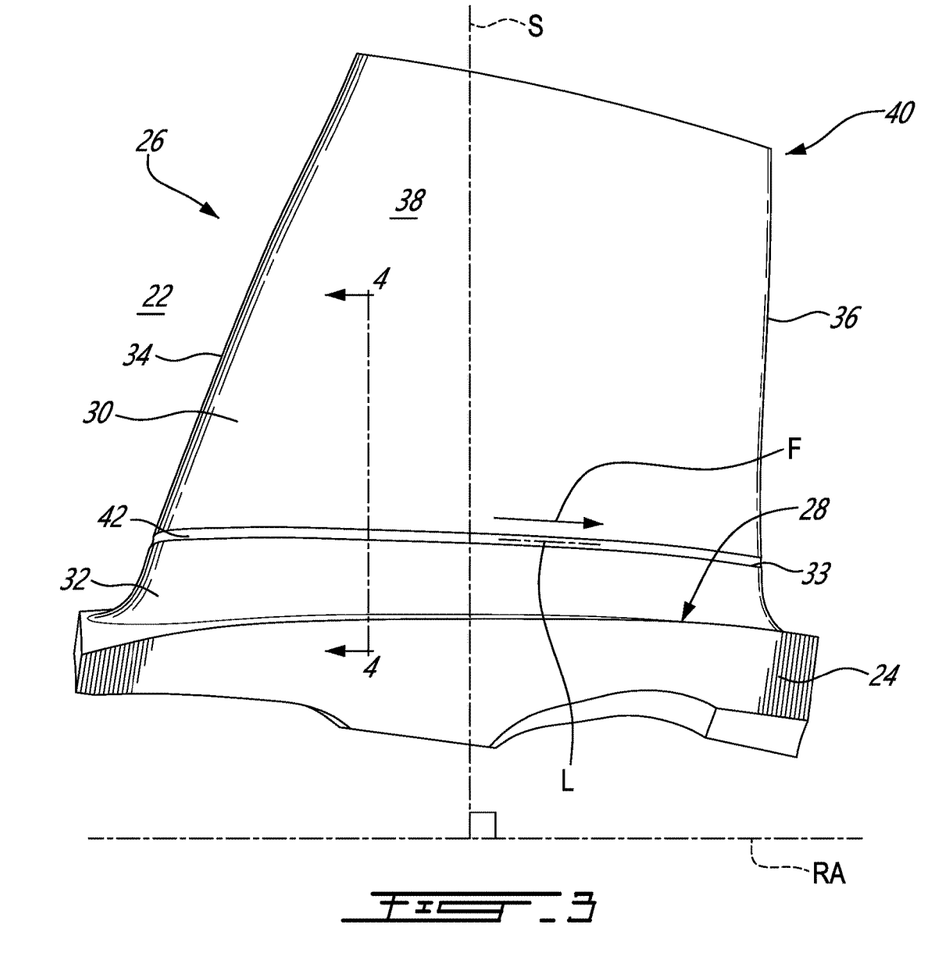
FIG. 3 is a side elevation view of an exemplary blade and platform of the integrated bladed rotor of FIG. 2.

FIG. 3 is a side elevation view of an exemplary blade 26 of IBR 20. Blade 26 is viewed in FIG. 3 along a direction normal to a plane containing both rotation axis RA and stacking line S. FIG. 3 also shows an axial cross-section of part of hub 24 from which blade 26 extends. Blade 26 may include airfoil 30 and root fillet 32 providing a smooth transition between platform 28 of hub 24 and airfoil 30. Airfoil 30 may be disposed radially outward of root fillet 32. Root fillet 32 may define a concave outer surface extending from platform 28 of hub 24 to airfoil 30. Root fillet 32 and airfoil 30 may have a surface continuity so that an outer surface of airfoil 30 and an outer surface of root fillet 32 may be touching at one or more locations. In some embodiments, root fillet 32 and airfoil 30 may have a tangent (angular) surface continuity at one or more (e.g., all) locations where outer surfaces of root fillet 32 and airfoil 30 meet along a common edge and that the tangent plane at each point along the common edge is equal for both outer surfaces. The common edge between root fillet 32 and airfoil 30 may also correspond to runout 33 of root fillet 32. In some embodiments, root fillet 32 may be a circular fillet and may be specified by one or more radii values. In various embodiments, root fillet 32 may have a uniform or a varied radius around blade 26.

Airfoil 30 may include leading edge 34 and trailing edge 36. Leading edge 34 may be disposed forward of trailing edge 36 relative to the general streamwise flow direction F of air interacting with airfoil 30. Airfoil 30 may include pressure side 38 and an opposite suction side 40 (shown in FIG. 4).

Airfoil 30 may include streamwise groove 42 formed into an exterior surface of airfoil 30. Groove 42 may be entirely disposed outside of root fillet 32. In other words, groove 42 may not be part of root fillet 32. Groove 42 may be disposed radially outward of root fillet 32. In various embodiments, groove 42 may be immediately adjacent (e.g., adjoining) root fillet 32, or may be spaced apart from root fillet 32.

Groove 42 may have a longitudinal axis L and may extend substantially along the streamwise direction of the air being conveyed in gas path 22 and interacting with airfoil 30. In some embodiments, some or at least a majority of longitudinal axis L may be substantially parallel to the expected flow direction F at corresponding axial locations along rotation axis RA. In some embodiments, the expected flow direction F of air interacting with airfoil 30 in the region of groove 42 may be related (e.g., parallel) to the axial cross-sectional profile of platform 28 shown in FIG. 3. In some embodiments, the expected flow direction F of air interacting with airfoil 30 the region of groove 42 may be related (e.g., parallel) to runout 33 of root fillet 32. For example, in some embodiments, some or a majority of groove 42 may be parallel to runout 33 of root fillet 32.

The streamwise orientation of groove 42 may provide a desired influence on crack propagation while providing little or minimal influence on the flow of air interacting with airfoil 30. In other words, at least part(s) of groove 42 may be oriented to be streamlined in order to offer low resistance to the flow of air through compressor 14. For example, in some embodiments, some, a majority, or an entirety of groove 42 may be parallel to the expected flow direction F of air (or of another working fluid) interacting with airfoil 30.

The expected flow direction F of air interacting with airfoil 30 may differ at different axial and/or radial locations of airfoil 30 depending on the geometric parameters of IBR 20, and/or based on operating parameter(s). The expected flow direction F selected for the purpose of orienting groove 42 may be selected to obtain a desired performance at one or more operating conditions. In some embodiments, an axial vector component of longitudinal axis L of groove 42 may be greater than a radial vector component of longitudinal axis L of groove 42. Longitudinal axis L of groove 42 may also have a lateral vector component (e.g., into or out of the page in FIG. 3) that may be based on the stagger angle of blade 26. Longitudinal axis L of groove 42 may be linear or non-linear.

In various embodiments, groove 42 may extend partially or completely around airfoil 30. In other words, groove 42 may extend partially or completely around stacking line S.

For example, groove 42 may extend on pressure side 38 and/or on suction side 40 of airfoil 30. In some embodiments, groove 42 may wrap around leading edge 34 and/or trailing edge 36. In some embodiments, groove 42 may extend continuously (e.g., be uninterrupted) around airfoil 30.

IBR 20 may be made from a suitable metallic material. In various embodiments, IBR 20 may be made by casting, machining and/or using other suitable manufacturing process(es). For example, groove 42 may be cast with the remainder of IBR 20 or maybe formed a machining operation subsequent to casting. For example, IBR 20, including groove 42 may be machined from a casting, forging or bar stock.

Figure 4:
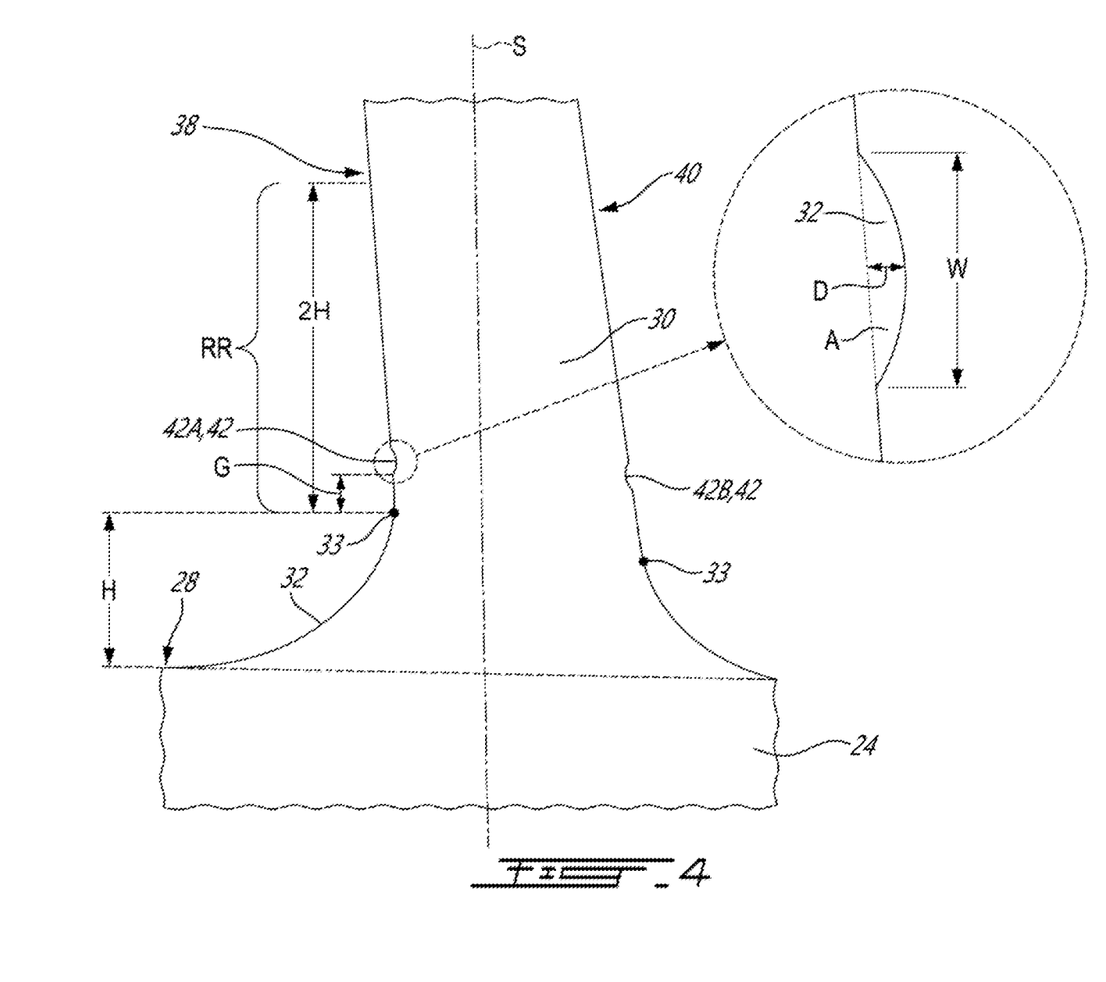
FIG. 4 is a cross-sectional profile of part of the blade and platform of FIG. 3 taken along line 4-4 in FIG. 3.

FIG. 4 is a cross-section view of part of the blade 26 and hub 24 of FIG. 3 taken along line 4-4 in FIG. 3. Groove 42 may extend from pressure side 38 to suction side 40 of airfoil 30. In some embodiments, groove 42 may extend completely around airfoil 30. For example, pressure side 38 may include first groove segment 42A, and suction side 40 may include second groove segment 42B where both first groove segment 42A and second groove segment 42B are part of the same groove 42. Alternatively, only one of pressure side 38 or suction side 40 may include groove 42. Alternatively, both pressure side 38 and suction side 40 may include respective and separate groove segments 42A, 42B in cases where groove 42 does not continuously extend from pressure side 38 to suction side 40. In some embodiments, airfoil 30 may include groove segments 42A, 42B that are at different spanwise (e.g., radial) locations along airfoil 30.

Groove 42 may have any suitable cross-sectional profile and size to provide a desired stress concentration that provide the desired influence on crack propagation. In some embodiments, a cross-sectional profile of groove 42 transverse to longitudinal axis L (shown in FIG. 3) of groove 42 may be a circular segment, or may be another suitable shape (e.g., U-shaped or V-shaped). Such circular segment may be a region (e.g., area A) of two-dimensional space that is bounded by an arc of a circle and by a chord connecting the endpoints of the arc. Groove 42 may have depth D measured from the outer surface of airfoil 30, and width W measured transversely to longitudinal axis L of groove 42. In some embodiments, depth D of groove 42 may be equal to or less than 50% of width W of groove 42. In some embodiments, depth D of groove 42 may be equal to or greater than 1% of width W of groove 42. In some embodiments, depth D of groove 42 may be between 1% and 50% of width W of groove 42.

In various embodiments, groove 42 may have a uniform (constant) or a varied area along a length (longitudinal axis L) of groove 42. For example, groove 42 may have area A on pressure side 38 that is different from area A of groove 42 on suction side 40. In some embodiments, area A of groove 42 on suction side 40 may be smaller than area A of groove 42 on pressure side 38 for preferred aerodynamic performance.

In various embodiments, groove 42 may have a uniform (constant) or a varied depth D along a length (longitudinal axis L) of groove 42. For example, groove 42 may have depth D on pressure side 38 that is different from depth D of groove 42 on suction side 40. In some embodiments, depth D of groove 42 on suction side 40 may be smaller than depth D of groove 42 on pressure side 38.

In various embodiments, groove 42 may have a uniform (constant) or a varied width W along a length (longitudinal axis L) of groove 42. For example, groove 42 may have width W on pressure side 38 that is different from width W of groove 42 on suction side 40. In some embodiments, width W of groove 42 on suction side 40 may be smaller than width W of groove 42 on pressure side 38.

In some embodiments, airfoil 30 may include a plurality of groove segments 42A, 42B connected together and having different cross-sectional dimensions. In some embodiments, airfoil 30 may include a plurality of disconnected groove segments 42A, 42B that have the same or different cross-sectional dimensions.

Root fillet 32 may provide a transition between outer platform 28 of hub 24 and airfoil 30. Root fillet 32 and airfoil 30 may have surface and optionally also have tangent continuity. Root fillet 32 may have a radial height H from platform 28 measured radially relative to rotation axis RA. Radial height H may correspond to a maximum radial height of root fillet 32 from platform 28. Radial height H may be measured from platform 28 to runout 33 of root fillet 32. Depending on the geometry of blade 26, runout 33 may not necessarily be at a uniform radial height H around airfoil 30. Runout 33 may define a radially inner extremity of airfoil 30. Accordingly, groove 42 may be disposed radially outward of root fillet 32. In some embodiments, groove 42 and root fillet 32 may be adjoining as shown in FIG. 3. In some embodiments, groove 42 may be radially spaced apart from root fillet 32 as shown by non-zero dimension G in FIG. 4. In various embodiments, groove 42 may be disposed anywhere along radial region RR of airfoil 30. Radial region RR may extend from radially outward from runout 33 of root fillet 32 to a distance of two or three times radial height H of root fillet 32. In other words, groove 42 may be disposed radially outwardly of root fillet 32 and radially inwardly of a distance of two or three times (i.e., 2H or 3H) radial height H of root fillet 32 from root fillet 32.

In some embodiments, every blade 26 of IBR 20 may each include an identical groove 42 to facilitate balancing of IBR 20. However, adequate balancing IBR 20 may also be achieved in other embodiments where not every blade 26 includes groove 42, or where some blades 26 of the same IBR 20 include grooves of different configurations.

Figure 5:
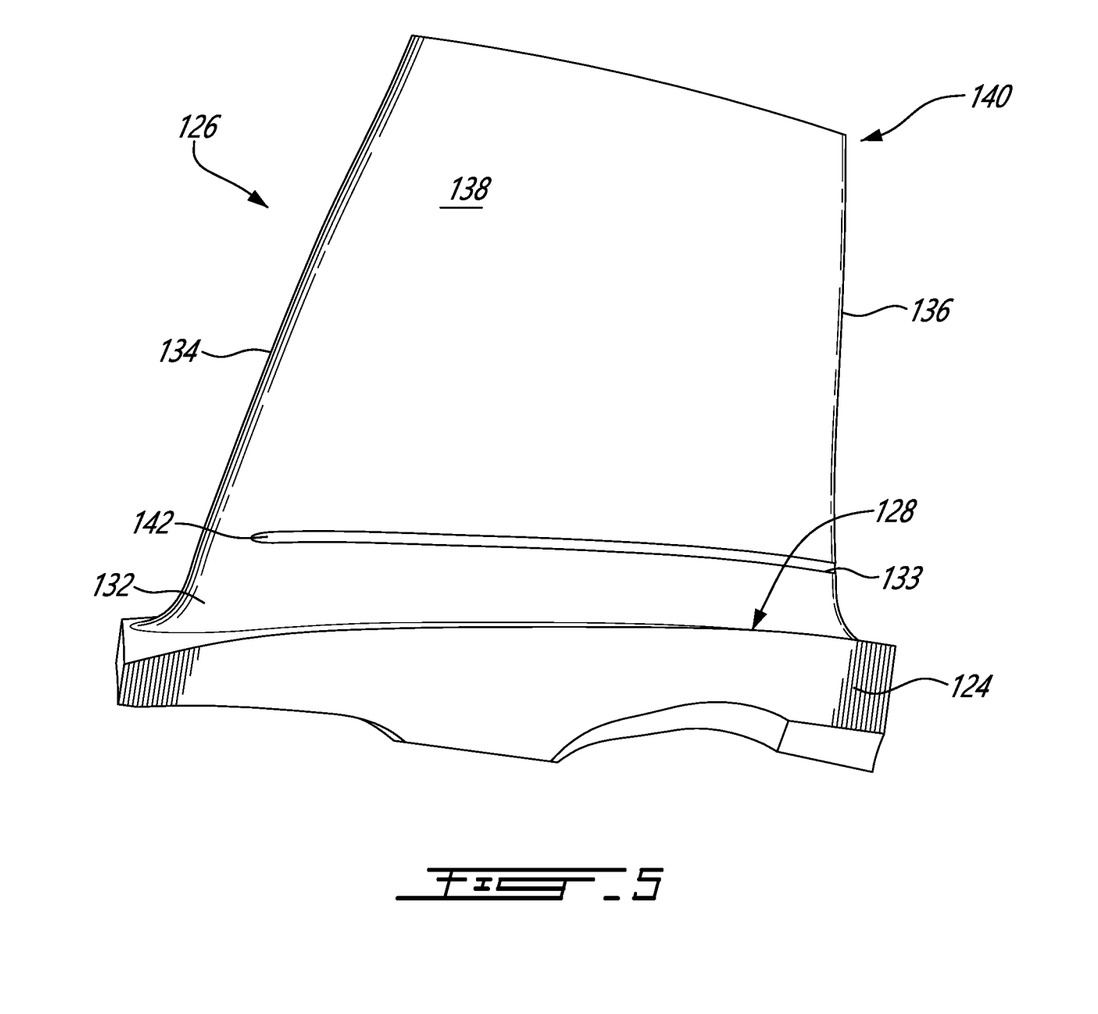
FIG. 5 is a side elevation view of another exemplary blade of another integrated bladed rotor.

FIG. 5 is an axial cross-section view of part of another exemplary integrated bladed rotor including one or more exemplary blades 126 and platform 128. Blade 126 and platform 128 may include elements previously described above. Like elements have been identified using reference numerals incremented by 100. Blade 126 may include airfoil 130 and root fillet 132 providing a smooth transition between platform 128 of hub 124 and airfoil 130. Root fillet 132 may include runout 133 at the intersection of root fillet 132 and airfoil 130. Airfoil 130 may be disposed radially outward of root fillet 132. Airfoil 130 may include leading edge 134 and trailing edge 136. Airfoil 130 may include pressure side 138 and opposite suction side 140.

In some applications, the stresses at leading edge 134 of airfoil 130 may be relatively high, and may be higher than the stresses in other region(s) of airfoil 130. Leading edge 134 may also be more susceptible to impact by foreign objects ingested by engine 10. Accordingly, in some situations, it may be desirable to have reduced or no groove-associated stress concentrations at and/or near leading edge 134 of airfoil 130. In some embodiments, the configuration of groove 142 may differ at and/or near leading edge 134 than in other regions of airfoil 130. In some embodiments, groove 142 may be smaller (e.g., smaller area A shown in FIG. 4) at and/or near leading edge 134 to provide a reduced stress concentration factor at and/or near leading edge 134 relative to other regions of airfoil 130. In some embodiments, groove 142 may be interrupted at and/or near leading edge 134 of airfoil 130. In other words, airfoil 130 may be devoid of groove 142 at and/or near leading edge 134 of airfoil 130.

Figure 6:
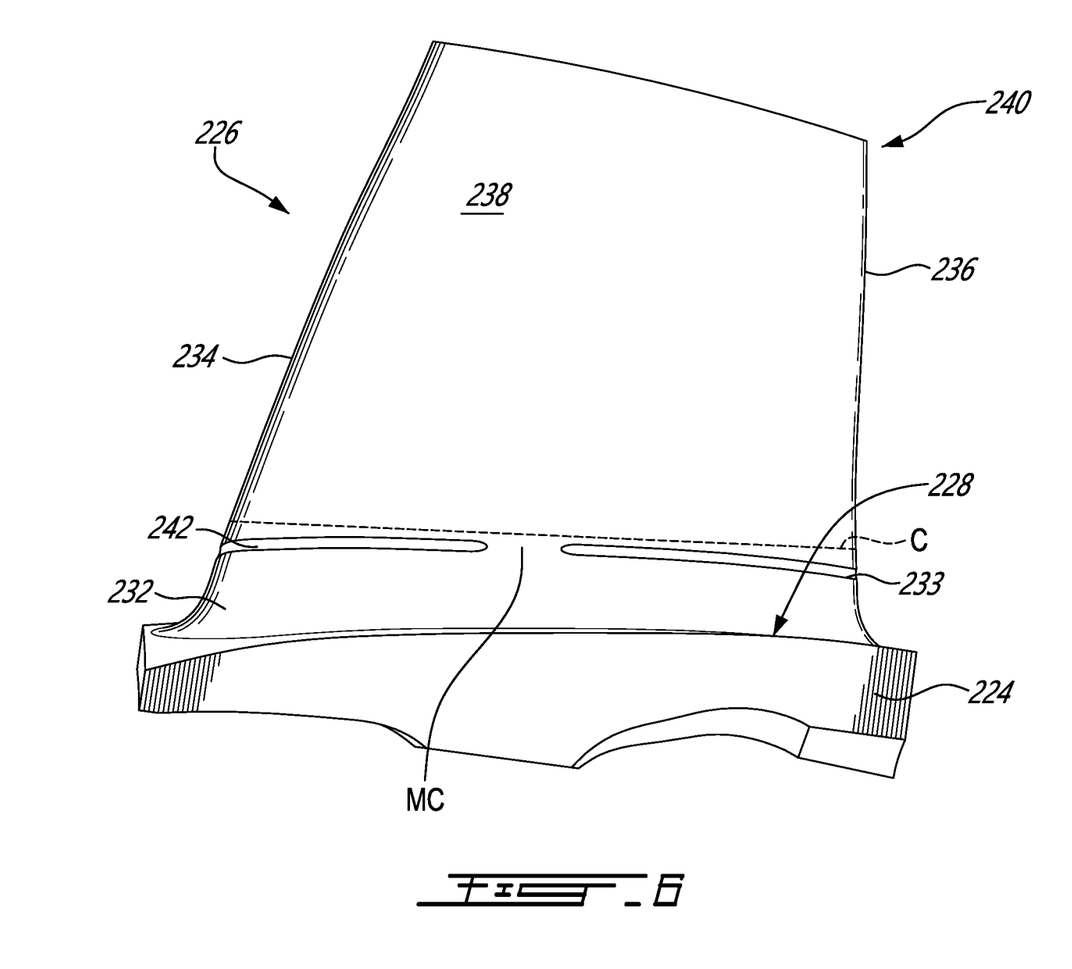
FIG. 6 is a side elevation view of another exemplary blade of another integrated bladed rotor.

FIG. 6 is an axial cross-section view of part of another exemplary integrated bladed rotor including one or more exemplary blades 226 and platform 228. Blade 226 and platform 228 may include elements previously described above. Like elements have been identified using reference numerals incremented by 200. Blade 226 may include airfoil 230 and root fillet 232 providing a smooth transition between platform 228 of hub 224 and airfoil 230. Root fillet 232 may include runout 233 at the intersection of root fillet 232 and airfoil 230. Airfoil 230 may be disposed radially outward of root fillet 232. Airfoil 230 may include leading edge 234 and trailing edge 236. Airfoil 230 may include pressure side 238 and opposite suction side 240. Airfoil 230 may also include exemplary chord C joining leading edge 234 and trailing edge 236 of airfoil 230.

In some applications, the stresses at a mid-chord region MC of airfoil 230 may be relatively high, and may be higher than the stresses in other region(s) of airfoil 230. Accordingly, in some situations, it may be desirable to have reduced or no groove-associated stress concentrations in mid-chord region MC of airfoil 230. In some embodiments, the cross-sectional profile of groove 242 may vary as a function of a position along chord C or as a function of an axial position along rotation axis RA. In some embodiments, the configuration of groove 242 may differ in mid-chord region MC of airfoil 230 compared to other regions of airfoil 230. In some embodiments, groove 242 may be smaller (e.g., smaller area A shown in FIG. 4) in mid-chord region MC of airfoil 230 to provide a reduced stress concentration factor in mid-chord region MC of airfoil 230. In some embodiments, groove 242 may be interrupted in mid-chord region MC of airfoil 230. In other words, airfoil 230 may be devoid of groove 242 in mid-chord region MC of airfoil 230.

Figure 7A:
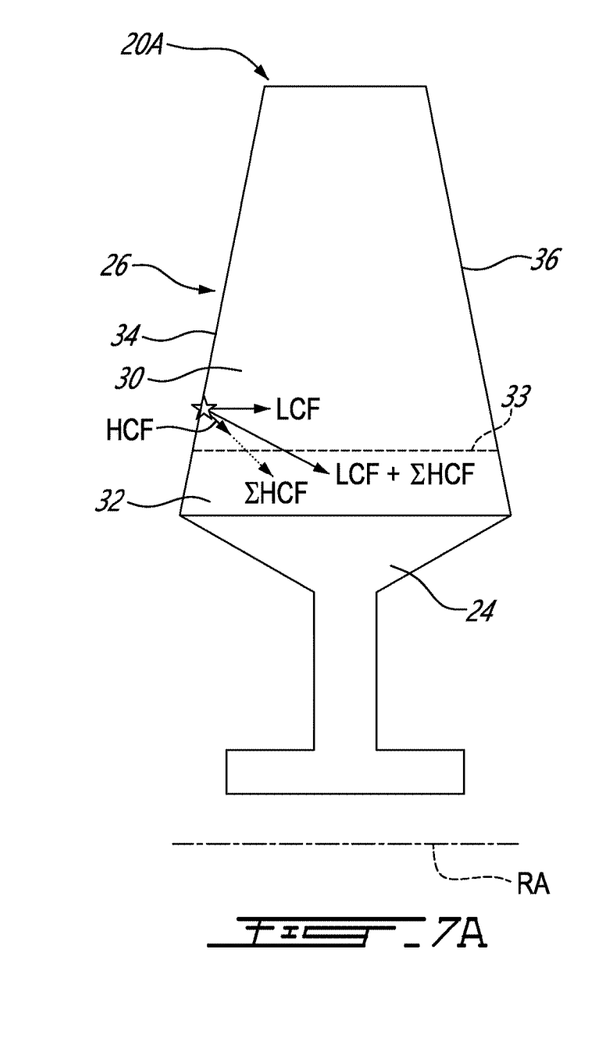
FIGS. 7A and 7B are schematic axial cross-section views of part of exemplary integrated bladed rotors without and with a crack-mitigating groove respectively.
Figure 7B:
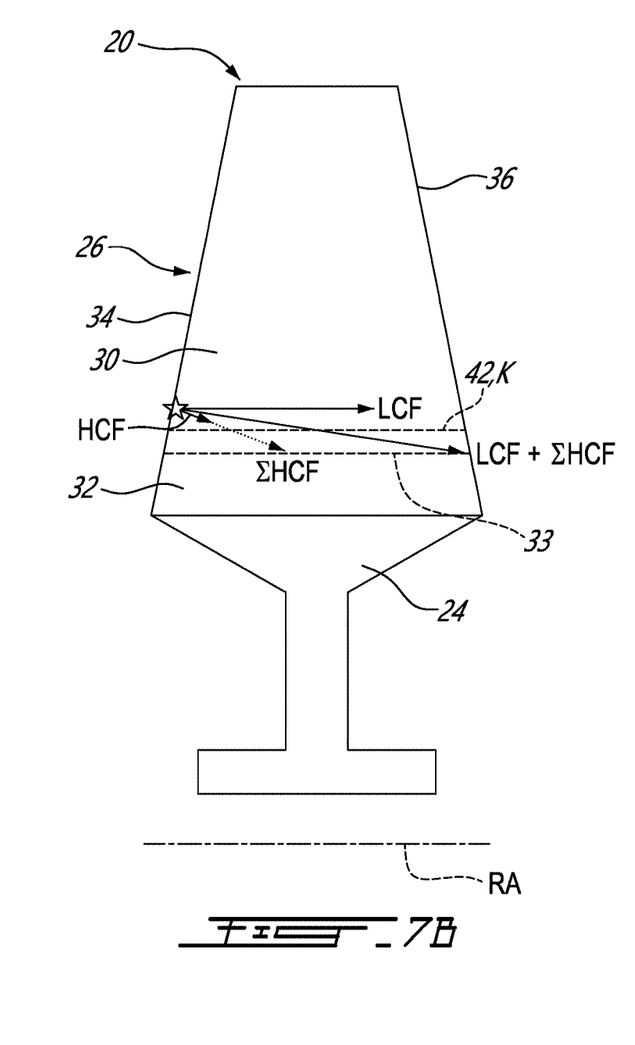

FIG. 7A is a schematic axial cross-section view of part of an exemplary integrated bladed rotor 20A (referred hereinafter as "IBR 20A") without crack-mitigating groove 42. FIG. 7B is a schematic axial cross-section view of part of IBR 20 with crack-mitigating groove 42. In operation, compressor blades 26 may be subjected to a steady stress associated with low-cycle-fatigue (LCF) as a result of centrifugal and thermal loads. Compressor blades 26 may also be subjected to vibratory stresses associated with high-cycle-fatigue (HCF) occurring at resonance conditions for example. When the useful life of blade 26 is exhausted and a fatigue crack is initiated on airfoil 30 for example, damage tolerance methods and tools may be used to determine the remaining crack propagation life and trajectory of the crack leading up to failure. The trajectory of the propagating crack may be important for determining the potential size, shape, and mass of the fragment that will be released from IBR 20A, 20. For a crack that originates from airfoil 30, the resulting fragment upon failure can be classified either as either a relatively benign blade release which may be contained by the casing of engine 10 surrounding IBR 20A, or as a disc rupture (i.e., large fragment) which may be more troublesome and may not be contained by the casing.

The trajectory of a propagating crack may be a function of the combined LCF-HCF stress field. Mathematically, the combined LCF-HCF stress field may be represented as a vector summation of the individual LCF and HCF crack growth contributions (e.g., LCF+ΣHCF). In general, LCF loads dominated by radial centrifugal loading may tend to grow the crack parallel to gas path 22 (shown in FIGS. 1 and 3), thereby promoting a containable blade release failure mode.

On the other hand, HCF loads may exhibit more complex stress fields and may occur at resonance conditions. For resonance modes with significant airfoil-hub participation, there is potential for the resulting dynamic stress field to grow the crack into hub 24. Even if the magnitude of the dynamic stresses are low in comparison to the steady stresses, the resulting modal frequency and accumulated HCF cycles may amplify the HCF vector (i.e., ΣHCF). In such case, the resulting failure mode may be an uncontained disc rupture.

The addition of groove 42 in airfoil 30 radially outward of root fillet 32 may influence crack propagation by discouraging the crack originating on airfoil 30 from growing into hub 24. In other words, the presence of groove 42 may influence crack propagation to promote a contained blade release as opposed to a disc rupture.

Groove 42 may serve this function by introducing stress concentration factor K in the radial flow stress direction as well as an increase in the local nominal stresses. This helps in favouring the LCF contribution of crack growth, which is predominately caused by radial stresses. Groove 42 may also amplify the radial stress contribution of the HCF stress field. Both these changes to the stress field may favour a blade release as opposed to a disc rupture.

Groove 42 may be used on compressor IBR 20 where the resulting airfoil steady stresses are low in comparison to dynamic stresses and the corresponding LCF lives are high. Groove 42 may be designed and positioned such that it does not produce a new critical lifing location and the minimum life of the IBR 20 is not significantly altered. For example, groove 42 may be added to airfoil 30 without altering a typical or desired root fillet geometry.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. An integrated bladed rotor of a gas turbine engine, the integrated bladed rotor comprising:
   a hub having a rotation axis and a radially outer platform relative to the rotation axis; and
   a plurality of blades extending radially outwardly from the platform of the hub, the blades being integrally formed with the hub to define a monolithic component with the hub, each blade including:
   an airfoil including a groove formed in an outer surface of the airfoil; and
   a root fillet providing a transition between the outer platform of the hub and the outer surface of the airfoil, the root fillet defining a concave surface extending from the outer platform of the hub to the outer surface of the airfoil,
   wherein:
   the groove is disposed radially outward of the root fillet;
   the groove is radially spaced apart from a runout of the root fillet at an intersection of the root fillet with the airfoil;

the root fillet and the outer surface of the airfoil have a tangent surface continuity at the intersection of the root fillet with the outer surface of the airfoil; and the outer surface of the airfoil is devoid of another groove disposed radially inwardly of the groove and another groove disposed radially outwardly of the groove.

2. The integrated bladed rotor as defined in claim 1, wherein a majority of the groove is parallel to an expected flow direction of a fluid interacting with the airfoil.

3. The integrated bladed rotor as defined in claim 1, wherein an axial vector component of an orientation of the groove is greater than a radial vector component of the orientation of the groove.

4. The integrated bladed rotor as defined in claim 1, wherein part of the groove is parallel to the runout of the root fillet at the intersection of the root fillet with the airfoil.

5. The integrated bladed rotor as defined in claim 1, wherein a majority of the groove is parallel to the runout of the root fillet at the intersection of the root fillet with the airfoil.

6. The integrated bladed rotor as defined in claim 1, wherein:
the airfoil has a pressure side and a suction side;
the groove includes a first groove segment on the pressure side;
the suction side includes a second groove segment; and
a depth of the second groove segment on the suction side is smaller than a depth of the first groove segment on the pressure side.

7. The integrated bladed rotor as defined in claim 6, wherein the groove includes the second groove segment.

8. The integrated bladed rotor as defined in claim 1, wherein:
the airfoil has a pressure side and a suction side; and
the groove extends from the pressure side to the suction side of the airfoil.

9. The integrated bladed rotor as defined in claim 1, wherein:
the groove extends completely around the airfoil; and
the groove has a uniform depth.

10. The integrated bladed rotor as defined in claim 1, wherein:
the airfoil has a leading edge; and
the airfoil is devoid of the groove at the leading edge of the airfoil.

11. The integrated bladed rotor as defined in claim 1, wherein:
the airfoil has a chord extending from a leading edge to a trailing edge of the airfoil; and
the groove is interrupted in a mid-chord region of the airfoil.

12. The integrated bladed rotor as defined in claim 1, wherein:
the root fillet has a radial height relative to the rotation axis; and
the groove is disposed radially outward of the root fillet, and radially inward of a distance of two times the radial height of the root fillet from the root fillet.

13. The integrated bladed rotor as defined in claim 1, wherein:
the groove has a depth measured from the outer surface of the airfoil and a width transverse to a longitudinal axis of the groove; and
the depth of the groove is equal to or less than half of the width of the groove.

14. The integrated bladed rotor as defined in claim 1, wherein a cross-sectional profile of the groove is a circular segment.

15. A monolithic bladed rotor of an axial compressor of a gas turbine engine, the monolithic bladed rotor comprising:
a hub having a rotation axis and a radially outer platform relative to the rotation axis; and
a blade integral with the hub and extending radially outwardly from the platform of the hub, the blade including:
an airfoil including a groove formed in an outer surface of the airfoil; and
a root fillet providing a transition between the outer platform of the hub and the outer surface of the airfoil,
wherein:
the root fillet extends from the outer platform to the outer surface of the airfoil;
the groove is disposed radially outward of a runout of the root fillet at an intersection of the root fillet with the airfoil;
the root fillet and the outer surface of the airfoil have a tangent surface continuity at the intersection of the root fillet with the outer surface of the airfoil; and
the outer surface of the airfoil is devoid of another groove disposed radially inwardly of the groove and another groove disposed radially outwardly of the groove.

16. The monolithic bladed rotor as defined in claim 15, wherein the groove has a streamlined orientation.

17. The monolithic bladed rotor as defined in claim 15, wherein:
the groove is radially spaced apart from the runout of the root fillet;
the root fillet has a radial height relative to the rotation axis; and
the groove is disposed radially inward of a distance of two times the radial height of the root fillet from the root fillet.

18. A gas turbine engine comprising:
an axial compressor for compressing air, the compressor defining a gas path for conveying the air, the compressor including a monolithic integrated bladed rotor including:
a hub having a rotation axis and a radially outer platform defining part of the gas path; and
a plurality of blades extending radially outwardly from the platform of the hub and into the gas path, the blades being integrally formed with the hub, two or more of the blades each including:
an airfoil including a groove formed in an outer surface of the airfoil, a majority of the groove being parallel to an expected flow direction of the air interacting with the airfoil; and
a root fillet providing a transition between the outer platform of the hub and the outer surface of the airfoil, the root fillet defining a concave surface extending from the outer platform of the hub to the outer surface of the airfoil,
wherein:
the groove is disposed radially outward of the root fillet;
the groove is radially spaced apart from a runout of the root fillet at an intersection of the root fillet with the airfoil;

the root fillet and the outer surface of the airfoil have a tangent surface continuity at the intersection of the root fillet with the outer surface of the airfoil; and the outer surface of the airfoil is devoid of another groove disposed radially inwardly of the groove and another groove disposed radially outwardly of the groove;

a combustor in which the air compressed by the compressor is mixed with fuel and ignited to generate a stream of combustion gas; and a turbine operatively connected to the combustor for extracting energy from the combustion gas.

* * * * *